(12) United States Patent
Weller et al.

(10) Patent No.: US 6,838,195 B2
(45) Date of Patent: Jan. 4, 2005

(54) INCREASED PACKING DENSITY IN SELF-ORGANIZED MAGNETIC TRAY

(75) Inventors: Dieter K. Weller, Gibsonia, PA (US);
Chao Liu, Pittsburgh, PA (US);
Timothy J. Klemmer, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 63 days.

(21) Appl. No.: 10/366,271

(22) Filed: Feb. 13, 2003

(65) Prior Publication Data

US 2004/0001367 A1 Jan. 1, 2004

Related U.S. Application Data

(60) Provisional application No. 60/392,680, filed on Jun. 28, 2002.

(51) Int. Cl.[7] .................................................. G11B 5/66
(52) U.S. Cl. ......................... 428/694 TM; 428/694 TS; 428/336; 427/128; 427/129; 427/130
(58) Field of Search .................... 428/694 TM, 394 TS, 428/336; 427/128, 129, 130

(56) References Cited

U.S. PATENT DOCUMENTS

| | | | |
|---|---|---|---|
| 3,982,234 A | 9/1976 | Voegeli | 340/174 |
| 4,373,173 A | 2/1983 | Robinson et al. | 360/121 |
| 4,616,237 A | 10/1986 | Pettigrew et al. | 346/135.1 |
| 4,724,444 A | 2/1988 | Pettigrew et al. | 346/1.1 |
| 4,758,307 A | 7/1988 | Pettigrew et al. | 156/643 |
| 4,868,006 A | 9/1989 | Yorkgitis et al. | 327/53.1 |
| 4,923,739 A | 5/1990 | Jin et al. | 428/221 |
| 4,928,132 A | 5/1990 | Pettigrew et al. | 346/135.1 |
| 5,028,939 A | 7/1991 | Hornbeck et al. | 346/160 |
| 5,216,631 A | 6/1993 | Sliwa, Jr. | 365/174 |
| 5,307,311 A | 4/1994 | Sliwa, Jr. | 365/174 |
| 5,452,166 A | 9/1995 | Aylwin et al. | 360/126 |

(List continued on next page.)

OTHER PUBLICATIONS

"Theory, Production and Mechanism of Formation of Monodispersed Hydrosois" by V. Lamer et al., *Journal of the American Chemical Society*, vol. 72, No. 11, Nov. 17, 1950, pp. 4847–4854.
"Monodisperse FePt Nanoparticles and Ferromagnetic FePt Nanocrystal Superlattices", by S. Sun et al., *Science*, vol. 287, Mar. 17, 2000, pp. 1989–1992.
"Self–Assembled Magnetic Nanoparticles Arrays", by S. Sun et al., *The Physics of Ultra–High–Density Magnetic Recording*, pp. 1–31, 1998.
"Present Status and Future Magnetic Data Storage", by D. Lambeth et al., *Magnetic Hysteresis in Novel Magnetic Materials*, 1997, pp. 767–780.
"Direct Imaging of Self–Assembled Magnetic Nanoparticle Arrays: Phase Stability and Magnetic Effects on Morphology", by S. Yamamuro et al., *Physical Review B*, vol. 65, pp. 224431-1–224431-9 (2002).
"Compositionally Controlled FePt Nanoparticle Materials", by S. Sun et al., *IEEE Transactions on Magnetics*, vol. 37, No. 4, pp. 1239–1243, (Jul. 4, 2001).
Notification of Transmittal of The International Search Report or the Declaration for PCT/US03/04620, 1994.

*Primary Examiner*—Ieszek Kiliman
(74) *Attorney, Agent, or Firm*—Westman, Champlin & Kelly, P.A.

(57) ABSTRACT

A self-organized magnetic array includes a plurality of magnetic primary nanoparticles are arranged on the substrate in a self-organized magnetic array. A plurality of magnetic interstitial nanoparticles are positioned between at least some of the primary nanoparticles in the self-organized magnetic array. A method of making such an array is also provided.

26 Claims, 7 Drawing Sheets

U.S. PATENT DOCUMENTS

| | | | |
|---|---|---|---|
| 5,488,681 A | 1/1996 | Deacon et al. | 385/37 |
| 5,491,762 A | 2/1996 | Deacon et al. | 385/16 |
| 5,544,268 A | 8/1996 | Bischel et al. | 385/4 |
| 5,569,485 A | 10/1996 | Dahlquist et al. | 427/65 |
| 5,581,642 A | 12/1996 | Deacon et al. | 385/15 |
| 5,586,206 A | 12/1996 | Brinkman et al. | 385/37 |
| 5,587,223 A | 12/1996 | White | 427/195 |
| 5,630,004 A | 5/1997 | Deacon et al. | 385/129 |
| 5,647,036 A | 7/1997 | Deacon et al. | 385/27 |
| 5,652,817 A | 7/1997 | Brinkman et al. | 385/37 |
| 5,664,032 A | 9/1997 | Bischel et al. | 385/4 |
| 5,675,461 A | 10/1997 | Aylwin et al. | 360/126 |
| 5,703,710 A | 12/1997 | Brinkman et al. | 359/283 |
| 5,724,463 A | 3/1998 | Deacon et al. | 385/27 |
| 5,732,177 A | 3/1998 | Deacon et al. | 385/122 |
| 5,742,518 A | 4/1998 | Gui et al. | 364/508 |
| 5,781,670 A | 7/1998 | Deacon et al. | 385/10 |
| 5,835,458 A | 11/1998 | Bischel et al. | 369/44.12 |
| 5,852,688 A | 12/1998 | Brinkman et al. | 385/16 |
| 5,855,753 A | 1/1999 | Trau et al. | 204/484 |
| 5,879,783 A | 3/1999 | Chang et al. | 428/141 |
| 5,887,089 A | 3/1999 | Deacon et al. | 385/22 |
| 5,905,611 A | 5/1999 | Yoda et al. | 360/113 |
| 5,911,018 A | 6/1999 | Bischel et al. | 385/16 |
| 5,912,997 A | 6/1999 | Bischel et al. | 385/15 |
| 5,978,524 A | 11/1999 | Bischel et al. | 385/4 |
| 6,007,623 A * | 12/1999 | Thiele et al. | 117/95 |
| 6,086,974 A * | 7/2000 | Thiele et al. | 428/65.3 |
| 6,146,761 A | 11/2000 | Hirotsu et al. | 428/402 |
| 6,162,532 A | 12/2000 | Black et al. | 428/323 |
| 6,254,662 B1 * | 7/2001 | Murray et al. | 75/348 |
| 6,262,129 B1 | 7/2001 | Murray et al. | 516/33 |
| 6,265,021 B1 | 7/2001 | Black et al. | 427/131 |
| 6,302,940 B2 | 10/2001 | Murray et al. | 75/348 |
| 6,331,364 B1 * | 12/2001 | Baglin et al. | 428/694 T |
| 6,383,597 B1 | 5/2002 | Fullerton et al. | 428/65.3 |
| 6,383,598 B1 | 5/2002 | Fullerton et al. | 428/65.7 |
| 6,391,430 B1 | 5/2002 | Fullerton et al. | 428/212 |
| 6,440,520 B1 | 8/2002 | Baglin et al. | 428/65.3 |
| 6,440,560 B1 | 8/2002 | Gates et al. | 428/403 |
| 6,468,670 B1 | 10/2002 | Ikeda et al. | 428/611 |
| 2002/0132083 A1 | 9/2002 | Weller et al. | 428/65.3 |

* cited by examiner

INCREASED PACKING DENSITY IN SELF-ORGANIZED MAGNETIC TRAY

CROSS-REFERENCE TO RELATED APPLICATION

This application claims priority from U.S. Provisional Application 60/392,680 filed on Jun. 28, 2002 for inventors Dieter K. Weller, Chao Liu and Timothy J. Klemmer and entitled INCREASED OF PACKING DENSITY: A NEW APPROACH TO INCREASE AREAL STORAGE DENSITY, the contents of which are incorporated herein in their entirety.

FIELD OF THE INVENTION

The present invention is directed toward magnetic recording media and, more particularly, toward magnetic recording media having self organized magnetic arrays (SOMAs) for high density recording.

BACKGROUND OF THE INVENTION

Increased storage capacity in magnetic recording has traditionally been addressed through improvements in the ability to store information on a particular storage disc with an increased areal density, e.g., decreasing the size of the inductive write element and read back sensor in a magnetic recording system. Until recently, these prior art approaches have been adequate for increasing the storage capacity of magnetic recording discs.

However, the areal density in magnetic recording technologies has now reached 60–70 $Gbit/in^2$ in certain products, and is increasing at a rate of approximately 60–100% per year. Data rates are increasing at a rate of approximately 30–40% per year. An earlier perceived density limit of 40 $Gbit/in^2$ has been surpassed in laboratory demonstrations. Densities in the range of 100–135 $Gbit/in^2$ have been demonstrated. In perpendicular recording technology, densities in the range of 100–1000 $Gbit/in^2$ have been targeted, and are considered feasible. These projections are generally based upon scaling assumptions and projected future technological advancements in the areas of read/write heads, recording media, channel electronics, tribological coatings, head-to-disc interface and narrow track servo capabilities.

An area of particular importance in magnetic recording is media noise suppression. At higher areal densities, smaller particles, or grains, are required to reduce the intrinsic media noise and to obtain a higher signal-to-noise ratio in the readback data. In addition to reducing and scaling the media grain size, control of the magnetic grain isolation and uniformity and control of the crystallographic texturing are also used to suppress media noise. Achieving low noise media by scaling to a small grain size, however, is limited by thermal instabilities. Such thermal instabilities are exhibited when using grain diameters below approximately 8–10 nm, and may render today's commonly used cobalt-alloy based recording media unsuitable for archival data storage purposes.

It has been found that smaller, stable grains can be obtained from magnetically harder materials, such as tetragonal $L1_0$ phased iron-platinum (FePt) or cobalt-platinum (CoPt) compounds, or artificially layered materials, such as Co/Pt or Co/Pd multilayers. FePt and CoPt compounds are known for their high magnetocrystalline anisotropy and magnetic moment, properties that are desirable for high density magnetic recording media. Other candidates for smaller, stable grain sizes are rare earth transition metal compounds, such as $Co_5Sm$ or $Nd_2Fe_{14}B$. However, it may be difficult to maintain these materials in a chemically stable state in hard disc media where minimal overcoat thickness is mandatory.

A common problem with high anisotropy materials, such as FePt and CoPt compounds, is their large coercivity, which can reach values on the order of 50,000 Oe. Such large coercivities far exceed the write field capabilities of today's magnetic recording heads. In an effort to alleviate the problem of large coercivity, vertical recording and thermally assisted recording schemes have been proposed.

Lithographically patterned media, also known as bit-patterning, may postpone the arrival of thermal instabilities in the recording media. Bit-patterning combines several hundred media grains into one single magnetic island, which does not require large coercivities. A comprehensive review of such lithographically patterned media techniques can be found in G. Hughes, "Patterned Media" in Physics of Ultrahigh Density Magnetic Recording, chapter 7, ed. Plumer, van Ek, Weller, Springer (2001), which reference is hereby incorporated herein by reference. The achievable densities using this bit-patterning lithographic approach is limited by lithography. In order to achieve approximately 1 $Tbit/in^2$, the island and space between the islands should be less than 12.5 nm. This is far beyond the projected Semiconductor Industry Association Roadmap for the next decade.

In order to push beyond the density limit set by lithography, self-assembled nanoparticle arrays have been proposed. These self-assembled, ordered and uniform nanomagnet arrays provide conceivable solutions to many proposed future recording schemes, e.g., conventional granular media, perpendicular media, thermally assisted recording and patterned media recording schemes. Such arrays are referred to as self-organized magnetic arrays (SOMA). The formation of such self organized magnetic arrays is described in, for example, U.S. Pat. No. 6,007,623, issued Dec. 28, 1999, entitled METHOD FOR MAKING HORIZONTAL MAGNETIC RECORDING MEDIA HAVING GRAINS OF CHEMICALLY-ORDERED FEPT OR COPT; U.S. Pat. No. 6,086,974, issued Jun. 11, 2000, entitled HORIZONTAL MAGNETIC RECORDING MEDIA HAVING GRAINS OF CHEMICALLY-ORDERED FEPT OF COPT; U.S. Pat. No. 6,254,662, issued Jul. 3, 2001, entitled CHEMICAL SYNTHESIS OF MONODISPERSE AND MAGNETIC ALLOY NANOCRYSTAL CONTAINING THIN FILMS; U.S. Pat. No. 6,331,364, issued Dec. 18, 2001, entitled PATTERNED MAGNETIC RECORDING MEDIA CONTAINING CHEMICALLY-ORDERED FEPT OR COPT.

Embodiments of the present invention provide solutions to these and other problems, and offer other advantages over the prior art.

SUMMARY OF THE INVENTION

A self-organized magnetic array includes a plurality of magnetic primary nanoparticles. A plurality of magnetic interstitial nanoparticles are positioned between at least some of the primary nanoparticles in the self-organized magnetic array. A method of making a self-organized magnetic array includes forming a self organized magnetic array having a plurality of primary magnetic nanoparticles and a plurality of magnetic interstitial nanoparticles which are positioned between at least some of the primary nanoparticles.

The invention also includes interstitial nanoparticles which are smaller than the primary nanonparticles. The invention also includes a magnetic medium formed with such a nanoparticle array.

The invention also includes a surfactant which surrounds the nanoparticles.

The array can be a two or three dimensional array.

The invention includes trigonal, tetrahedral and octahedral shaped voids.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
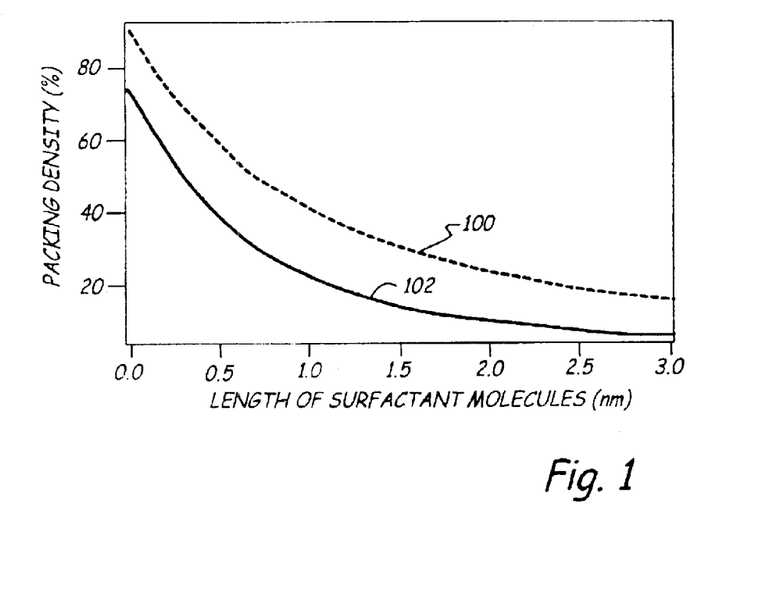
FIG. 1 is a graph of packing density versus surfactant molecule length.

In order to achieve areal densities beyond 1 Terabit/in$^2$, Self-Organized Magnetic Arrays (SOMA) have been proposed. The demonstration of the synthesis of monodispersed high anisotropy FePt nanoparticles with stable magnetization reversal transitions at room temperature has increased interest in the field. In forming such Self-Organized Magnetic Arrays, the FePt nanoparticles are coated by a layer of surfactant molecules such as oleic acid and oleylamine to prevent agglomeration. However, these surfactant molecules, while preventing agglomeration, are also a significant factor in defining and limiting the distance between adjacent nanoparticles. The inter-particle distance in an array of self-assembled particles is determined by the length of the surfactant molecules. Thus, the packing density of the molecules is also a function of the length of the surfactant chain. FIG. 1 is a graph of packing density in percent versus surfactant molecule length in nanometers as calculated for 4 nm diameter particles. The plot 100 shown in FIG. 1 is for a two dimensional array and the plot 102 is for a three dimensional array.

Figure 2A:
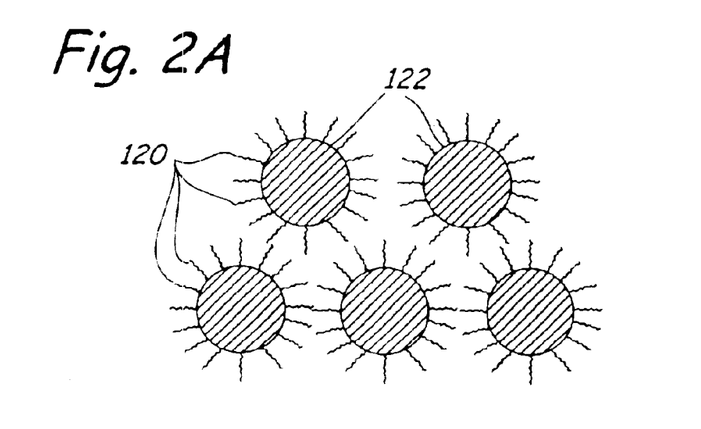
FIG. 2A is a schematic diagram showing nanoparticles in a self-organized magnetic array.
Figure 2B:
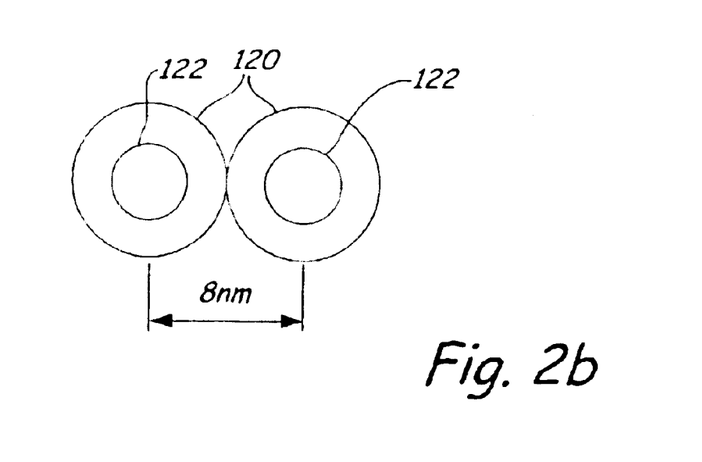
FIG. 2B is a diagram of a hard sphere model of the nanoparticles of FIG. 2A.

The carbon chain length of oleic acid and oleylamine molecules is about 2 nm. FIG. 2A is a diagram showing surfactant chains 120 extending from nanoparticles 122 in a self-organized magnetic array. FIG. 2B is a model of the nanoparticles 122 in which the surfactant chains 120 are modeled as a hard sphere. As illustrated in FIGS. 2A and 2B, with nanoparticles having a four nanometer diameter, and with the carbon chain of the oleic acid and oleylamine molecules of about 2 nm, the inter-particle distance will be about 8 nm.

The packing density of the monodispersed nanoparticles which are assembled onto a substrate is therefore determined by the length of the surfactant molecule chains. Surfactants having shorter carbon chains can be used to reduce the inter-particle distance. This will accordingly increase the packing density. However, as discussed below, even with shorter carbon chains, there is still significant void space that is not utilized in the array. The present invention provides a technique for utilizing this void space to increase the packing density.

In the present invention, the void space between adjacent nanoparticles is filled with interstitial particles to thereby increase the packing density. The increased packing density provides increased signal strength during read back of magnetically stored data and decreased jitter at the bit transitions in ultra-high density storage systems.

Figure 3A:
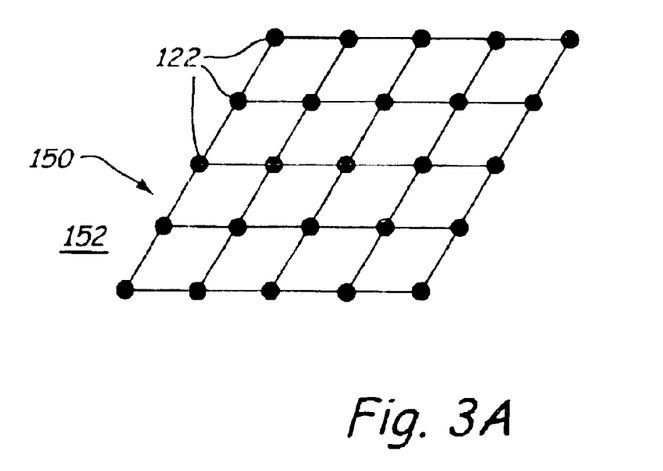
FIG. 3A is a diagram of a hexagonal two dimensional array of nanoparticles.
Figure 3B:
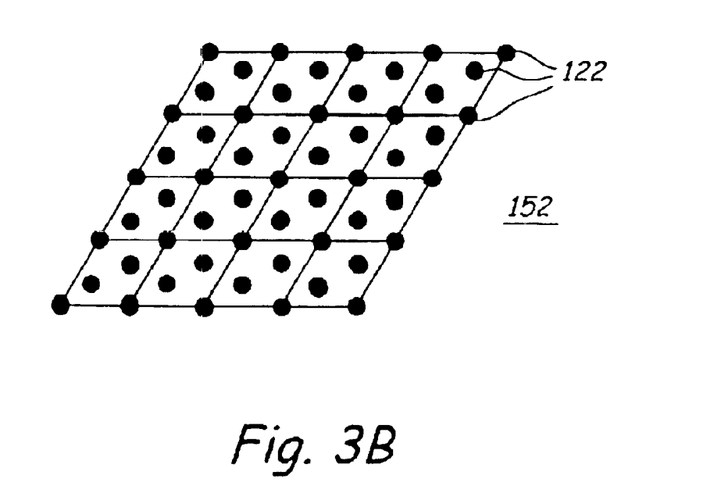
FIG. 3B is a diagram of a three dimensional array of a self-organized magnetic array.

Self-assembled nanoparticles behave like atoms inside a crystal such that they arrange themselves in a lattice. FIG. 3A is a diagram showing a two dimensional hexagonal array 150 formed by self-organized nanoparticles 122 on a substrate 152. FIG. 3B is a diagram showing the arrangement of the self-organized nanoparticles when a number of hexagonal arrays 150 are stacked three dimensionally upon one another with ABC stacking (face centered cubic, i.e., fcc).

Monodispersed nanoparticles coated with surfactant molecules can be regarded as hard spheres. In the following analysis, the spheres are assumed to be arranged in a hexagonal array when assembled into a lattice. Both two dimensional arrays and three dimensional arrays may be used for information storage. In the following analysis, the nanoparticles are assumed to have a diameter of 4 nm (for example, FePt) coated with two nanometer surfactant molecules. The packing density is defined as the areal or volume fraction which is occupied by the magnetic particles. Table 1 gives the definition of symbols used in the subsequent discussion:

TABLE 1

| SYMBOL | DEFINITION |
|---|---|
| $P_A$ | Packing density for 2-D array |
| $P_V$ | Packing density for 3-D array |
| $R_L$ | Radius of large particles (magnetic cores) |
| $R_S$ | Radius of small trigonal void |
| $R_T$ | Radius of small tetrahedral void |
| $R_O$ | Radius of small octahedral void |
| L | Length of the surfactant molecule |

In this example, with 4 nm diameter magnetic nanoparticles coated with 2 nm surfactant molecules, $R_L$=L.

The areal packing density, $P_A$, for a self-assembled two dimensional array is:

$$P_A=(\pi R_L^2 * 3/6)/[0.5 \sin 60°(2R_L+2L)^2]=22.7\% \qquad \text{EQ. 1}$$

As illustrated by Equation 1, in a two dimensional array, 77% of the area is not occupied by magnetic material.

Figure 4A:
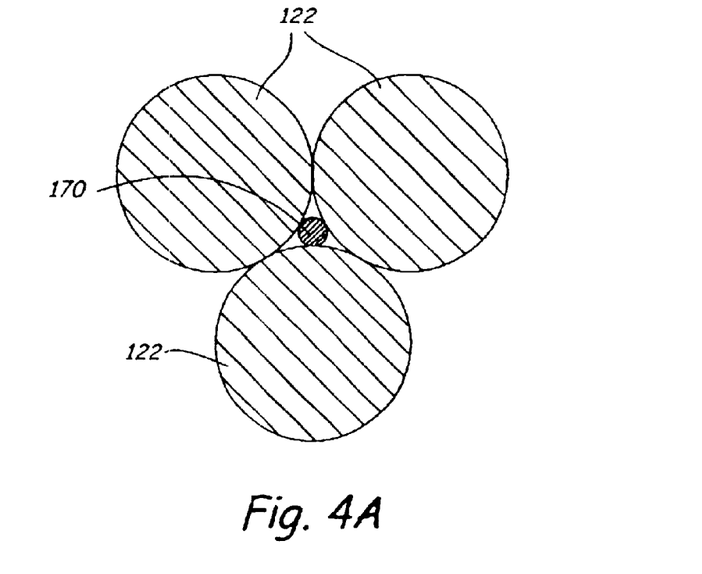
FIG. 4A is a diagram which illustrates interstitial void sites in a two dimensional hexagonal array.
Figure 4B:
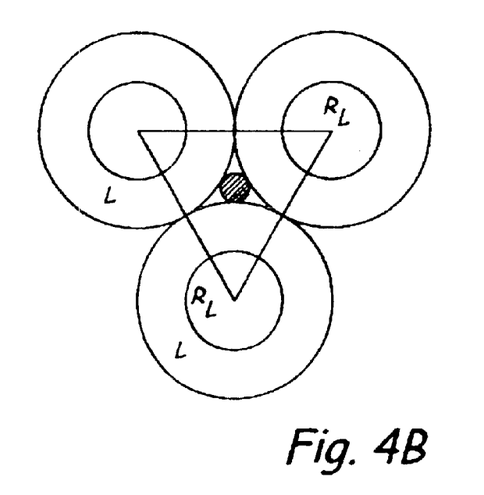
FIG. 4B is a hard sphere model of the diagram of FIG. 4A.

FIG. 4A is a hard sphere model and FIG. 4B is a diagram which illustrates the void area formed between three adjacent nanoparticles in a two dimensional array. At the central location between the three particles, a void area is formed between the intersection of the surfactant molecules. As used herein, this void region is referred to a trigonal hole and has a radius $R_S$ (i.e., the radius of nanoparticle 170). $R_S$ can be calculated as:

$$R_S = (R_L + L)/\cos 30° - 2R_L \qquad \text{EQ. 2}$$

The void between the three nanoparticles is of size to accommodate a sphere of up to $0.3095\ R_L$. Thus, the packing density $P_A$, for this configuration can be calculated as:

$$P_A = \{[2*\pi R_S^2/\pi R_L^2] + 1\} * \{(\pi R_L^2 * \tfrac{3}{6})/[0.5 \sin 60°(2R_L + 2L)^2]\} = 27.0\% \qquad \text{EQ. 3}$$

Thus, if the trigonal holes are occupied with magnetic material, the packing density will be increased by 4.3% to 27%. As used herein, nanoparticles 122 are referred to as primary nanoparticles and a nanoparticle 170 which fills the void between primary nanoparticles is referred to as an interstitial nanoparticle. The interstitial nanoparticle 170 is smaller in diameter than a primary nanoparticle 122 and is positioned between at least some of the primary nanoparticles 122 in the self-organized magnetic array.

Figure 5A:
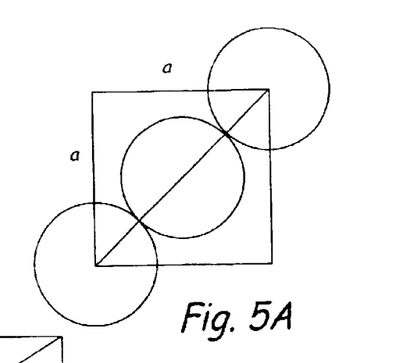
FIG. 5A is a schematic diagram showing atoms along the face of the fcc structure.
Figure 5B:
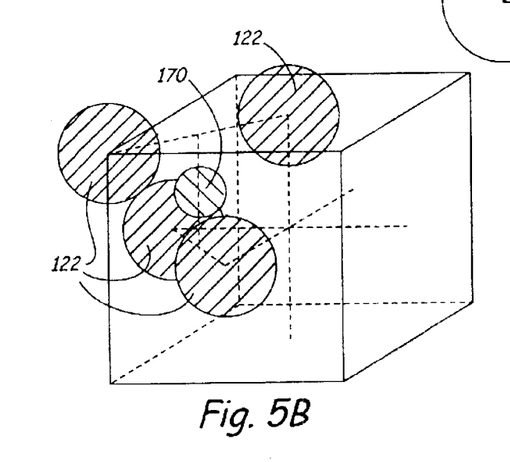
FIG. 5B is a diagram showing tetrahedral sites in a three dimensional self-aligned array.
Figure 5C:
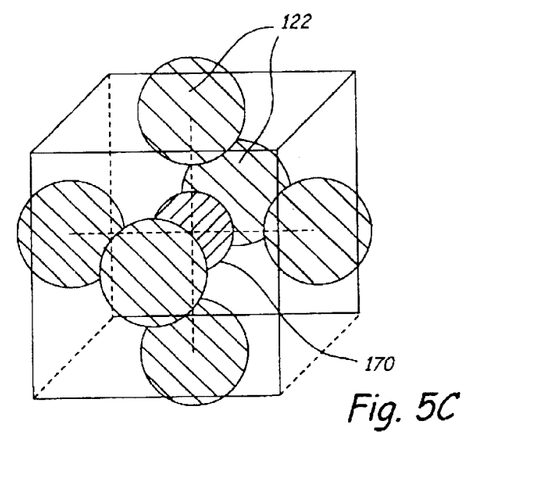
FIG. 5C is a diagram showing tetrahedral sites in a self-aligned array.

The interstitial voids in a three dimensional array can also be filled to achieve a packing density increase even greater than that achieved with a two dimensional array. FIG. 5A is a view of atoms along the face of the fcc structure of a self-assembled array. FIG. 5B illustrates the filling of "tetrahedral" void sites with an interstitial nanoparticle 170 and FIG. 5C shows the filling of "octahedral" void sites with interstitial nanoparticle 170. According to FIG. 5A, the following equation can be derived:

$$R_L + L = 2^{1/2}a/4 \qquad \text{EQ. 4}$$

The packing density $P_v$ for a self-assembled three dimensional array is as follows:

$$P_v = 4*[4\pi R_L^3/3]/a^3 = 9.30\% \qquad \text{EQ. 5}$$

With $2R_L = 2^{1/2}a/4$. Thus, in a three dimensional array, 91% of the space is not occupied. There are two types of void holes for a three dimensional void array. The first type is a "tetrahedral" hole (filled by nanoparticle 170 in FIG. 5B) and the second type is an "octahedral" hole (filled by nanoparticle 170 in FIG. 5C). The tetrahedral holes can hold a sphere with a radius of up to $0.449R_L$. The octahedral holes can accommodate a sphere with a radius of up to $0.828R_L$.

When the tetrahedral sites are filled, the packing density for the three dimensional array can be derived as follows:

$$R_L + L + R_T = 3^{1/2}a/4 \qquad \text{EQ. 6}$$

$$R_T = 0.449\ R_L$$

$$P_V = \{2*[4\pi(0.449\ R_L)^3/3]/(4\pi R_L^3/3) + 1\}*$$

$$\{4[4\pi R_L^3/3]/a^3\} = 11.0\%$$

Similarly, for the octahedral sites illustrated in FIG. 5C, the packing density is as follows:

$$R_L + L + R_L + L + 2R_O = a \qquad \text{EQ. 7}$$

$$R_O = 0.828\ R_L$$

$$P_V = [4\pi(0.828\ R_L)^3/3]/(4\pi R_L^3/3) + 1\}*$$

$$\{4*[4\pi R_L^3/3]/a^3 = 14.6\%$$

If only the tetrahedral void holes are occupied, the packing density is increased by 1.7% to 11%. If only the octahedral void holes are occupied the packing density is increased by 5.3% to 14.6%. However, if both the tetrahedral and octahedral holes are occupied, the packing density is increased by 7% to 16% in accordance with equation 8.

$$P_v = \{2*[4\pi(0.449R_L)^3/3]/(4\pi R_L^3/3) + [4\pi(0.828R_L)^3/3]/(4\pi R_L^3/3) + 1\}*\{4*[4\pi R_L^3/3]/a^3\} = 16.3\% \qquad \text{EQ. 8}$$

The nanoparticle array formed by the primary nanoparticles and the interstitial nanoparticles can be fabricated using any appropriate technique. For example, chemical synthesis of FePt nanoparticles can be used. Monodispersed nanoparticles can be formed using known nucleation and growth steps. Reagents are injected into a reaction vessel to raise the precursor concentration above the nucleation threshold. Then, a rapid spontaneous nucleation burst occurs to relieve the super saturation. Next, a slow and controlled growth on the nuclei is performed. The separation between the nucleation step and the growth step is required to obtain monodispersed particles.

Figure 6A:
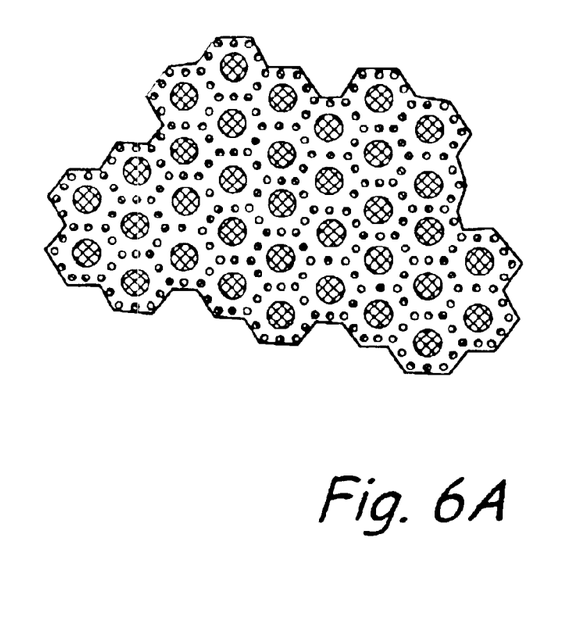
FIG. 6A is a TEM (Tunneling Electron Microscope) image of a self-assembled bi-modal array.
Figure 6B:
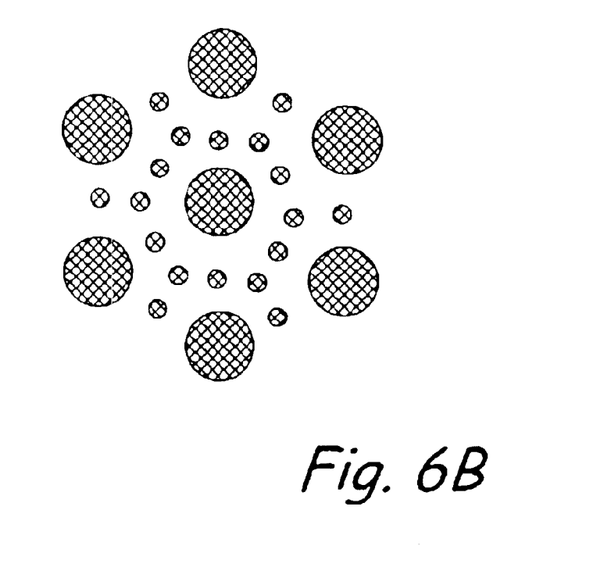
FIG. 6B is a schematic diagram which illustrates the particles of FIG. 6A.

Previously fabricated monodispersed nanoparticles (such as FePt) can be formed to a desired size and used as seeds. The seeds are put into a reaction vessel and the reagent concentration can be controlled to be either below the nucleation threshold or above the nucleation threshold. If the reagent concentration is below the nucleation threshold, there will be no additional new nuclei formed and the growth reaction will be dominated by the already existing seeds. However, if the reagent concentration is above the nucleation threshold, new nuclei are formed and at the same time the existing seeds will continue to grow. This will result in the production of nanoparticles having two different sizes. FIG. 6A is a TEM image of a bi-modal distribution of nanoparticles formed in accordance with this technique. FIG. 6B is a schematic representation of the primary nanoparticles and interstitial nanoparticles.

If the number of newly formed nuclei can be controlled, the size of both the large and the small nanoparticles can be controlled. If the size of the smaller particles is 0.3095 that of the larger particles, close packing of a two dimensional array as described above is realized. The packing density will increase from 22.7% to 27%. Three dimensional arrays are formed using a similar technique.

Turning to one specific example, the synthesis of FePt nanoparticles through a polyol process to reduce the platinum acetylacetonate and thermal decomposition of iron pentacarbonyl is used. FePt nanoparticles are synthesized by the above method with the initial ratio of iron pentacarbonyl and platinum acetylacetonate as 1.5:1. The average diameter of these as-prepared nanoparticles is 3.79 nm with a standard deviation of 0.37 nm. These nanoparticles are regarded as monodispersed and they self assemble into an organized assembly when deposited onto a carbon coated TEM grid.

Adding more chemical reagent into the reaction system and having the preformed particles as the seeds, larger size monodispersed particles can be obtained. Here, we adopted the same strategy to grow bimodal size distribution FePt particles. As a typical experiment, 10 ml of the as-prepared particles (around 20 ml in total volume) are washed using flocculent (Ethanol) and dispersion solvent (Hexane). Then, 0.197 g platinum acetylacetonate, 0.431 g 1,2-Hexadecandediol, 20.0 ml phenyl ether and the above washed FePt particles in hexane, are put into the reaction flask. Ar is used to degas the reaction system and hexane is removed when the temperature is above the boiling point of hexane (67° C.). At 100° C., $Fe(CO)_5$ (98 $\mu$l, 0.75 mmol) is added, then the mixture is heated to reflux for 30 minutes. After the heating mantle is turned off and the reaction mixture is allowed to cool down, the particles solution is washed. Finally, the particles are dispersed into 8.0 ml Hexane in the presence of 0.30 ml mixture of oleic acid and oleylamine. A drop of the particle solution is deposited onto the carbon coated TEM grid for TEM studies. Bimodal size distribution particles and a $AB_5$ superstructure of the particles are seen. The coexistence of the two different sizes particles results in the formation of the superstructure of $AB_5$. Size analysis shows that two different size particles are formed with the average diameter as 6.14 nm and 3.18 nm, respectively. Synthesis of the bimodal size distribution FePt particles can be described by the La-Mer diagram.

Figure 7A:
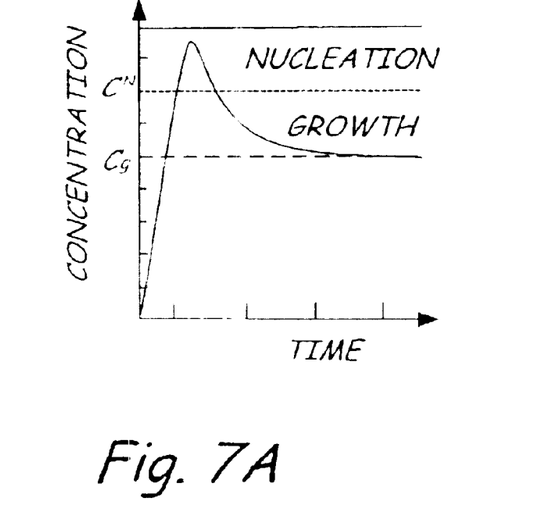
FIGS. 7A and 7B are graphs of concentration and rate, respectively, versus time during formation of nanoparticles.
Figure 7B:
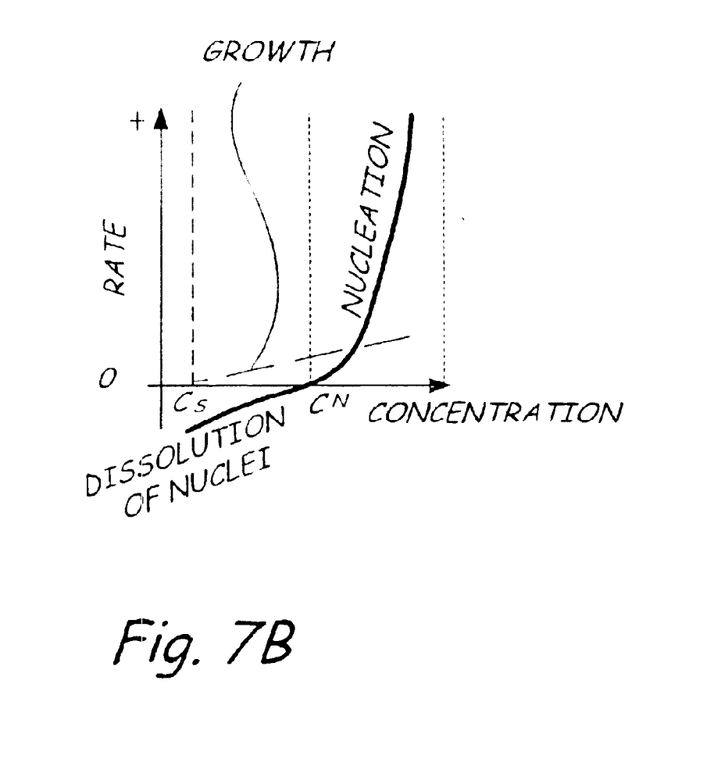

The concentration of the precursors produced when the reaction temperature is reached determines whether or not new nuclei will be formed. If the precursor concentration is above the nucleation threshold, newly formed nuclei will be in the reaction system together with the existing particles as the seeds. If the precursors concentration is below the nucleation threshold, there are no newly formed nuclei in the reaction system. If there is not another nucleation process, which means no newly formed nuclei, the only seeds available in the reaction system are the existing particles. Therefore after the growth stage, larger size particles are formed and the particles are monodispersed However, in the present case, there is a second nucleation process. Therefore, not only are there the existing seeds, i.e. 3.7 nm in diameter, but also there are the newly formed seeds. However, the growth of the seeds is not enough to balance the increasing concentration of precursors. This leads to two sizes of particles after the growth stage, the larger size particles based on the particle seeds and the smaller size particles based on the newly formed nuclei. The relationship between concentration of precursors and time (FIG. 7A) and between size increasing rate and precursor concentration (FIG. 7B) is shown. $C_s$ is the solubility concentration and $C^*$ is the nucleation threshold. The newly formed nuclei will subsequently grow into the 3.18 nm particles. Together with the larger size particles from the existing 3.79 nm particles, an $AB_5$ superstructure is formed. The nucleation rate is much more strongly dependent on supersaturation than the growth rate. As shown in FIG. 7B, nucleation rate is much more strongly dependent on supersaturation than the growth rate. That is, the nucleation rate is negligibly small when the supersaturation level is low, but increases abruptly when the supersaturation exceeds some critical level. In contrast, the growth rate increases gradually with increasing concentration. Therefore, even at the nucleation stage, the existing 3.79 nm seeds begin to grow.

With this present invention, the oleic acid and oleylamine can be exchanged for carbon chained surfactants having a shorter length. By reducing the length of the surfactant, the packing density of the nanoparticles can be increased. Surface properties can be controlled to increase packing density. Surface modifications of loosely packed surfactant molecules with tight coatings such as polystyrene and silica can be used. This will modify the surface properties during the assembly process onto the substrate and also control the thickness. A seeding process can be used to obtain solution phase synthesis of bimodal or polymodal distributed particles. This provides interstitial nanoparticles that fill the void spaces in the matrix.

The present invention provides a technique to reduce the jitter noise and increase the readback signal for magnetic storage medium. Jitter noise is proportional to the grain size at the transition between adjacent bits. The addition of smaller size particles into the larger size particle array decreases the average size of the grain such that jitter noise is decreased. Further, with the present invention surface roughness is reduced because the void holes between adjacent particles is filled. This will provide a smoother medium. The readback signal received by the read sensor is also increased because the packing density within a particular bit is increased.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the self organized magnetic array while maintaining substantially the same functionality without departing from the scope and spirit of the present invention. In addition, although the preferred embodiment described herein is directed to a storage system for magnetically storing information it will be appreciated by those skilled in the art that the teachings of the present invention can be applied to other self organized arrays such as those used in spintronics, nanowire, and quantum computing, without departing from the scope and spirit of the present invention.

What is claimed is:

1. A self-organized magnetic array, comprising:
   a plurality of magnetic primary nanoparticles arranged in a self-organized magnetic array; and
   a plurality of magnetic interstitial nanoparticles positioned between at least some of the primary nanoparticles in the self-organized magnetic array.

2. The array of claim 1 wherein the interstitial nanoparticles are smaller than the primary nanoparticles.

3. The array of claim 1 including a surfactant which surrounds each of the plurality of primary nanoparticles.

4. The array of claim 3 wherein a void space is created between the surfactant which surrounds adjacent nanoparticles and an interstitial nanoparticle fills the void space.

5. The array of claim 4 wherein the void space comprises a trigonal hole and the self-organized magnetic array comprises a two dimensional array.

6. The array of claim 4 wherein the void space comprises a tetrahedral hole and the self-organized magnetic array comprises a three dimensional array.

7. The array of claim 4 wherein the void space comprises an octahedral hole and the self-organized magnetic array comprises a three dimensional array.

8. The array of claim 1 wherein the primary nanoparticles comprises of FePt.

9. The array of claim 3 including a surface coating which surrounds the surfactant.

10. The array of claim 9 wherein the surface coating comprises polystyrene.

11. The array of claim 9 wherein the surface coating comprises silica.

12. A magnetic recording media comprising the self-organized magnetic array of claim 1.

13. A method of making a magnetic recording for magnetic recording, comprising:
   providing a substrate;
   forming a self organized magnetic array on the substrate comprising:
      a plurality of magnetic nanoparticles; and
      a plurality of magnetic interstitial nanoparticles which are smaller than the primary nanoparticles and positioned between at least some of the primary nanoparticles.

14. The method of claim 13 wherein forming the self-organized magnetic array comprises adding a reagent to a plurality of seed nanoparticles, wherein the reagent concentration is greater than a nucleation threshold.

15. The method of claim 13 including forming nanoparticles by raising a precursor concentration above a nucleation threshold to cause a rapid spontaneous nucleation burst.

16. The method of claim 15 including performing a slow and controlled growth on the nuclei following the nucleation burst.

17. The method of claim 13 wherein the interstitial nanoparticles are smaller than the primary nanoparticles.

18. The method of claim 13 providing a surfactant surrounds each of the plurality of primary nanoparticles.

19. The method of claim 18 wherein a void space is created between the surfactant which surrounds adjacent nanoparticles and an interstitial nanoparticle fills the void space.

20. The method of claim 19 wherein the void space comprises a trigonal hole and the self-organized magnetic array comprises a two dimensional array.

21. The method of claim 19 wherein the void space comprises a tetrahedral hole and the self-organized magnetic array comprises a three dimensional array.

22. The method of claim 19 wherein the void space comprises an octahedral hole and the self-organized magnetic array comprises a three dimensional array.

23. The method of claim 13 wherein the primary nanoparticles comprise FePt.

24. The method of claim 18 including providing a surface coating which surrounds the surfactant.

25. The method of claim 24 wherein the surface coating comprises polystyrene.

26. The method of claim 24 wherein the surface coating comprises silica.

* * * * *

UNITED STATES PATENT AND TRADEMARK OFFICE
CERTIFICATE OF CORRECTION

PATENT NO. : 6,838,195 B2
DATED : January 4, 2005
INVENTOR(S) : Weller et al.

It is certified that error appears in the above-identified patent and that said Letters Patent is hereby corrected as shown below:

Title page,
Item [54], Title, change "TRAY" to -- ARRAY --.

Signed and Sealed this

Twenty-ninth Day of November, 2005

JON W. DUDAS
*Director of the United States Patent and Trademark Office*